United States Patent [19]

Smyk

[11] Patent Number: 5,029,169
[45] Date of Patent: Jul. 2, 1991

[54] METHODS AND APPARATUS FOR FAULT DETECTION

[75] Inventor: Dariusz A. Smyk, Piscataway, N.J.

[73] Assignee: Bell Communications Research, Inc., Livingston, N.J.

[21] Appl. No.: 378,162

[22] Filed: Jul. 11, 1989

[51] Int. Cl.$^5$ ............................................. G06F 11/00
[52] U.S. Cl. ...................................... 371/19; 364/200; 364/264.6; 364/281.5; 364/281.6
[58] Field of Search ................................. 371/19, 16.1; 364/200 MS File, 900 MS File, ; 340/825.5, 825.51

[56] References Cited

U.S. PATENT DOCUMENTS

| | | | |
|---|---|---|---|
| 3,906,454 | 9/1975 | Martin | 364/200 |
| 4,354,227 | 10/1982 | Hays, Jr. et al. | 364/200 |
| 4,574,350 | 3/1986 | Starr | 364/200 |
| 4,709,326 | 11/1987 | Robinson | 364/200 |
| 4,791,554 | 12/1988 | Hirota et al. | 364/200 |
| 4,809,168 | 2/1989 | Hennessy et al. | 364/200 |
| 4,819,159 | 4/1989 | Shipley et al. | 364/200 |

OTHER PUBLICATIONS

"Hierachiacal Ordering of Sequential Processes", E. W. Dijkstra, *Acta Informatica*, vol. 1, No. 2, 1971, pp. 115-138.

"Specification and Proof Techniques for Serializer", R. Atkinson and C. Hewitt, *Report of the MIT.*

*Artifical Intelligence Laboratory*, Cambridge, Masschusetts, Aug. 1977.

"Monitors: An Operating System Structuring Concept", C. A. R. Hoare, *Communications of the ACM*, vol. 17, No. 10, Oct. 1974, pp. 549-557.

"Process Structuring Synchronization and Recovery Using Atomic Actions", D. B. Lomet, *Proceedings of the ACM Conference on Language Design for Reliable Software*, Signplan Notices, vol. 12, No. 3, Mar. 1977, pp. 128-137.

"Time, Clocks and the Ordering of Events in a Distributed System", *Communications of the ACM*, vol. 24, No. 7, Jul. 1978, pp. 558-565.

"An Optimal Algorithm for Mutual Exclusion in Computer Networks", *Communication of the ACM*, vol. 24, No. 1, Jan. 1981, pp. 9-17.

*Primary Examiner*—Charles E. Atkinson
*Attorney, Agent, or Firm*—James W. Falk; Leonard Charles Suchyta

[57] ABSTRACT

A data processing system is disclosed in which each software process monitors every other software process for failures. The detection of a failure can then be used to initiate any desired failure recovery strategy. Software failure detection takes place by having each software process assigned an imaginary resource by a resource locking mechanism. All other software processes request an assignment to the same imaginary resource. Whenever a software process fails, the assigned imaginary resource is released by the failed process and hence is available for assignment to the other software process. This availability of another process' resource is interpreted as a failure of that process, and initiates failure recovery. No actual resources are used, and a standard resource allocation mechanism, such as is used to assign shared read and exclusive write access to a file, is used to perform the locking functions.

10 Claims, 4 Drawing Sheets

EXCLUSIVE LOCKOUT ALGORITHM

SHARED LOCKOUT ALGORITHM

EXCLUSIVE LOCK REQUEST

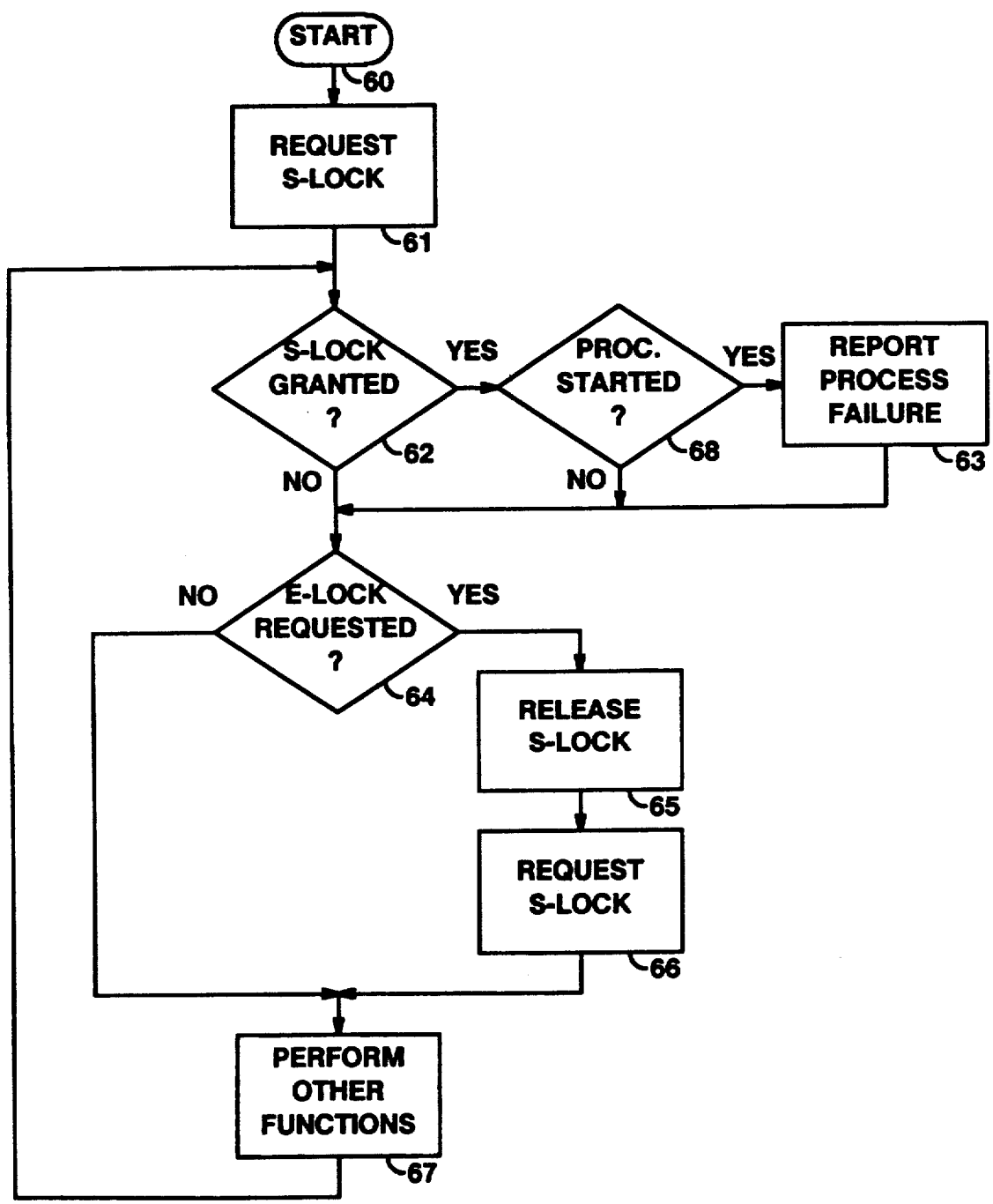

METHODS AND APPARATUS FOR FAULT DETECTION

TECHNICAL FIELD

This invention relates to fault detection in complex data processing systems and, more particularly, to the detection of faults in a plurality of software processes.

BACKGROUND OF THE INVENTION

The increased dependence on data processing systems for business, social, economic and political purposes has forced a demand for more reliable data processing systems. There are two basic approaches to the design of reliable systems: fault avoidance and fault tolerance. Fault avoidance is achieved by utilizing highly reliable components, thereby reducing the possibility of a failure. However, no matter how reliable the components, eventually a component failure will occur which causes a system failure. Moreover, the cost of such fault avoidance systems increases exponentially with the level of component reliability, making this approach an uneconomic choice for many applications.

A reliable system can also be designed to be fault tolerant, i.e., able to operate normally even in the presence of faults. Assuming the inevitability of failures, sufficient redundancy is built into the system to provide the extra resources needed to keep the system operating after a failure. Many strategies are known for utilizing these redundant resources in order to improve reliability. Failed components can be replaced. Even in the absence of redundant components, fault recovery actions such as retries, attempts to correct the failure, reconfiguration and rollback can be attempted. All of these fault recovery strategies, however, depend upon the ability to accurately detect faults or failures in the system.

The problem of detecting failures in a data processing system is greatly magnified when it is desired to detect software failures as well as hardware failures. While monitoring hardware for signs of failure is a well-known technique, there is no comparable prior art for monitoring software components for failures. There is therefore a great need for a reliable and dynamic strategy for detecting failures in a plurality of software processes, whether executing on the same processor or executing on multiple processors in a distributed processing system.

SUMMARY OF THE INVENTION

In accordance with the illustrative embodiment of the present invention, reliable and dynamic detection of software failures is accomplished by utilizing a resource locking mechanism. As is well-known, resource locking mechanisms allow a plurality of software processes to synchronize access to shared resources. Such locking mechanisms make use of a queuing arrangement which permits processes to wait in the queue until a particular resource is available. Such resource locking mechanisms have been used in the prior art to control access to resources such as file or device managers. Write access, for example, can be given to one user at a time (an exclusive lock) while read access can be given to a plurality of users at at time (a shared lock).

Such locking mechanisms are taught in the following references:

1. R. L. Martin U.S. Pat. No. 3,906,454, granted Sept. 16, 1975.
2. "Hierarchical Ordering of Sequential Processes," by E. W. Dijkstra, published in *Acta Informatica*, Volume 1, Number 2, 1971, pages 115-138.
3. "Specification and Proof Techniques for Serializers" by R. Atkinson and C. Hewitt, *Report of the MIT Artificial Intelligence Laboratory*, Cambridge, Mass., August 1977.
4. "Monitors: An Operating System Structuring Concept," by C. A. R. Hoare, published in *Communications of the ACM*, Volume 17, Number 10, October 1974, pages 549-557.
5. "Process Structuring, Synchronization, and Recovery Using Atomic Actions," by D. B. Lomet, published in the *Proceedings of the ACM Conference on Language Design for Reliable Software*, SIGPLAN Notices, Volume 12, Number 3, March 1977, pages 128-137.
6. *Operating System Principles*, by Brinch Hansen, Prentice Hall, Englewood Cliffs, N.J., 1973.
7. "An Optimal Algorithm for Mutual Exclusion in Computer Networks", *Communications of the ACM*, Volume 24, Number 1, January 1981, pages 9-17.
8. "Time, Clocks and the Ordering of Events in a Distributed System", *Communications of the ACM*, Volume 24, Number 7, July 1978, pages 558-565.

One particularly simple mutual exclusion lockout algorithm, which will be disclosed in connection with the present invention, is disclosed on pages 56 and 57 of the text *Algorithms for Mutual Exclusion* by M. Raynal, The MIT Press, Cambridge, Mass., 1986. The use of such a locking mechanism for the purpose of determining which of a plurality of processors shall coordinate all of the processors is taught in the copending application of T. C. Ely et al., Ser. No. 197,283, filed May 23, 1988, now U.S. Pat. No. 5,003,464 issued 3/26/91, and assigned to applicant's assignee.

Such resource locking mechanisms typically have two different modes of operation, called the exclusive mode and the shared mode. In the exclusive mode, a single process has an exclusive lock on the resource and hence has an exclusive right to use the resource. Other processes can obtain the use of the resource only if the owner of the exclusive lock relinquishes the exclusive lock. In the shared mode, any one of a plurality of different processes can have a shared lock on a particular resource and hence a right to use the resource. The resource must, of course, be of the type which a plurality of requesters can simultaneously use. An exclusive lock request for the shared resource will not be granted until *all* processes having a shared mode lock request relinquish their locks. Any lock requests, whether exclusive or shared, which cannot be immediately satisfied, are stored in a first in-first out (FIFO) request queue. When a resource becomes available, the request queue is checked and the lock on that resource granted to the first valid lock request on the queue, and all other compatible lock requests if the lock is shared.

In accordance with the illustrative embodiment of the present invention, each process in a data processing system requests an exclusive lock on an imaginary resource assigned to that process. At the same time, all other processes in the system request shared locks on the same imaginary resources assigned to that process. Moreover, each process has the highest priority for gaining the lock on its own assigned imaginary resource. In such a situation, any process's ability to obtain a shared lock on the imaginary resource assigned to another process is an indication that the process having the high priority exclusive lock is inoperative. Thus all other processes are informed of the failure of the one process by the fact that their own request for a shared lock on the imaginary resource assigned to the failed process is granted. The strategy of the present invention depends on the fact that a failing component releases all locks which the component was holding prior to the failure. It is to be noted that no actual resources are involved in the strategy, but merely the granting and denial of locks by the locking mechanism.

In accordance with one feature of the present invention, the various processes can be asynchronously notified of the granting of shared locks, or the various processes can periodically check to see if the shared lock has been granted.

One major advantage of the present invention is its ability to detect simultaneous failures in any number of processes, up to the last process. This last process is required to report the failures of all of the other processes. If it is desired to monitor all processes, a dummy process can be included which includes only the lock monitoring capability.

In accordance with another feature of the present invention, the processes competing for the imaginary resources can be included in the same processor or can be distributed over a plurality of processors in a distributed processing system, with no increase in the complexity of the failure detection system. Moreover, the present invention relies on a resource lockout of physical resources such as files or controllers.

BRIEF DESCRIPTION OF THE DRAWINGS

A complete understanding of the present invention may be gained by considering the following detailed description in conjunction with the accompanying drawing, in which:

FIG. 6 shows a general flowchart of an exclusive lock monitoring procedure useful in the fault detection arrangements of the present invention.

To facilitate reader understanding, identical reference numerals are used to designate elements common to the figures.

DETAILED DESCRIPTION

Figure 1:
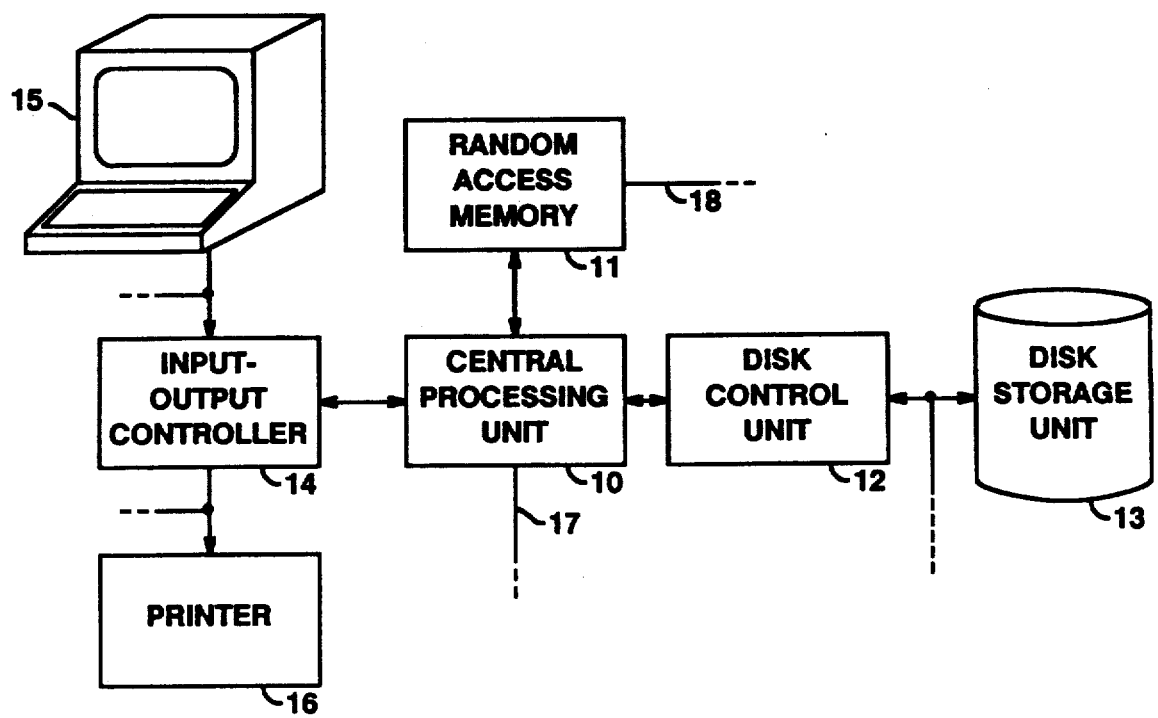
FIG. 1 shows a general block diagram of the major hardware components of a data processing system in which the fault detection arrangements of the present invention will find use.

Referring more particularly to FIG. 1 of the drawings, there is shown a general block diagram of a computer hardware system comprising a Central Processing Unit (CPU) 10 and a Random Access Memory (RAM) unit 11. Computer programs stored in the RAM 11 are accessed by CPU 10 and executed, one instruction at a time, by CPU 10. Data, stored in other portions of RAM 11, are operated upon by the program instructions accessed by CPU 10 from RAM 11, all in accordance with well-known data processing techniques. CPU 10 may, of course, comprise multiple processors and interact with multiple memory units 11 by way of caches for data and/or instructions, all as is also well-known in the data processing art.

As suggested by line 17, CPU 10 may, in fact, be one of a plurality of central processing units in a multiprocessor or distributed processing system. Similarly, as suggested by line 18, RAM 11 may be one of a plurality of random access memories serving the data processing system of FIG. 1.

Central Processing Unit (CPU) 10 also controls and accesses a disk controller unit 12 which, in turn, accesses digital data stored on one or more disk storage units such as disk storage unit 13. In normal operation, programs and data are stored on disk storage unit 13 until required by CPU 10. At this time, such programs and data are retrieved from disk storage unit 13 in blocks and stored in RAM 11 for rapid access.

Central Processing Unit (CPU) 10 also controls an Input-Output (IO) controller 14 which, in turn, provides access to a plurality of input devices such as CRT (cathode ray tube) terminal 15, as well as a plurality of output devices such as printer 16. Terminal 15 provides a mechanism for a computer operator to introduce instructions and commands into the computer system of FIG. 1, and may be supplemented with other input devices such as card and tape readers, remotely located terminals, optical readers and other types of input devices. Similarly, printer 16 provides a mechanism for displaying the results of the operation of the computer system of FIG. 1 for the computer user. Printer 16 may similarly be supplemented by line printers, cathode ray tube displays, phototypesetters, graphical plotters and other types of output devices.

The constituents of the computer system of FIG. 1 and their cooperative operation are well-known in the art and are typical of all computer systems, from small personal computers to large main frame systems. The architecture and operation of such systems are well-known and, since they form no part of the present invention, will not be further described here.

Figure 2:
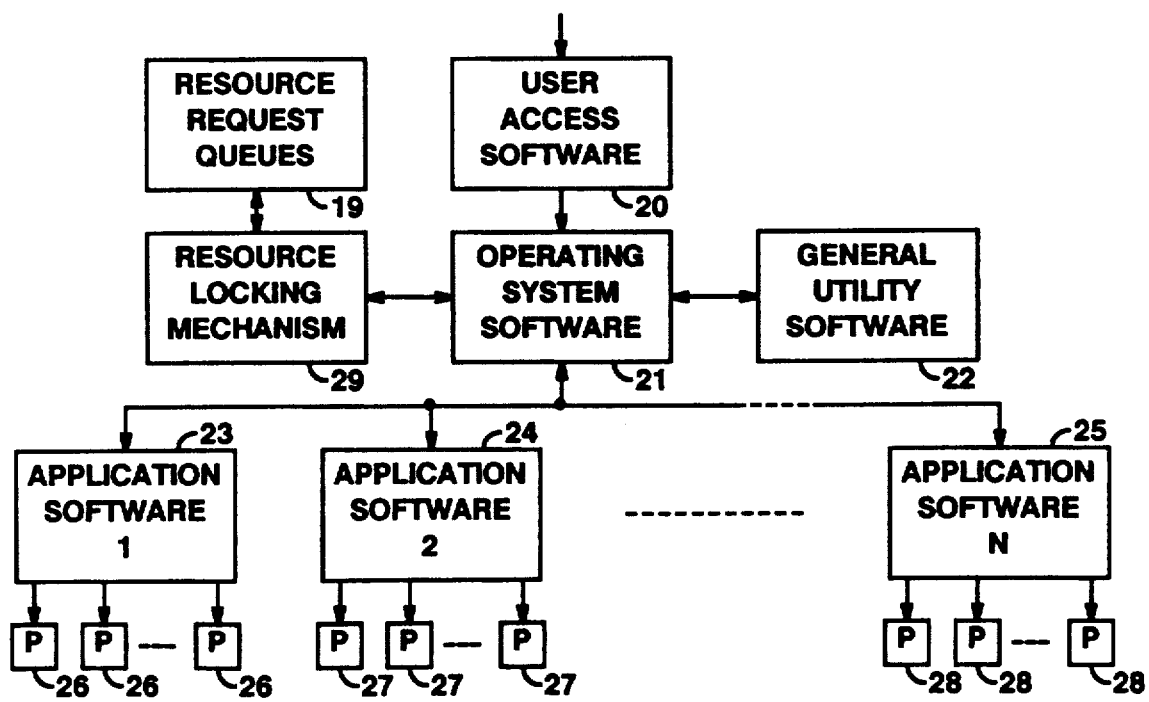
FIG. 2 shows a general block diagram of the major software components of a data processing system in which the fault detection arrangements of the present invention will find use.

In FIG. 2 there is shown a graphical representation of a typical software architecture for a computer system such as that shown in FIG. 1. The software of FIG. 2 comprises an access mechanism 20 which, for simple personal computers, may comprise no more than turning the system on. In larger systems, providing service to a larger number of users, login and password procedures would typically be implemented in access mechanism 20. Once access mechanism 20 has completed the login procedure, the user is placed in the operating system environment 21. Operating system 21 coordinates the activities of all of the hardware components of the computer system (shown in FIG. 1) and provides a number of utility programs 22 of general use to the computer user. Utilities 22 might, for example, comprise assemblers and compilers, mathematical routines, basic file handling routines and system maintenance facilities. One such utility software program is shown as resource locking mechanism 29. Mechanism 29 serves to assign resources such as one of the memories such as memory 11, one of the disk storage units such as unit 13, or one of the processing units such as unit 10, to the various software processes forming the other components of FIG. 2. Locking mechanism 29 utilizes a plurality of resource request queues 19 to insure the assignment of resources to the requesters in the same order as the requests are made. Locking mechanism 29 will be described in greater detail in connection with FIGS. 3 and 4.

The computer software system of FIG. 2 typically also includes a plurality of application programs such as application software 23, 24, ... 25. Application software 23-25 might, for example, comprise an editor, a spread sheet program, a graphics package, a data base manager, and so forth. Each of the application programs 23 through 25 includes or provides access to a plurality of programmed processes 26, 27, ... 28, respectively. It is the programmed processes 26 through 28 which actually perform the tasks necessary to carry out the purpose of the corresponding application program. In order to make effective use of these application packages, the user must be able to execute the processes 26-28 at the time, and in the sequence, necessary to accomplish the user's goals.

In many applications such as those depicted in FIG. 2, it is vital that failed processes be detected in order to carry out a desired failure recovery procedure. The present invention is concerned with methods and apparatus for performing such failure detection. Each of the processes 26, 27, ... 28 includes the necessary routines to carry out this failure detection as shown in the flow charts of FIGS. 3, 4, 5 and 6. The routines shown as flow charts in FIGS. 3, 4, 5 and 6, are also shown as pseudocode in the APPENDIX to this specification. It is believed that the creation and execution of the computer programs necessary to carry out these processes are readily apparent to those skilled in the programming art from the present disclosure.

Figure 3:
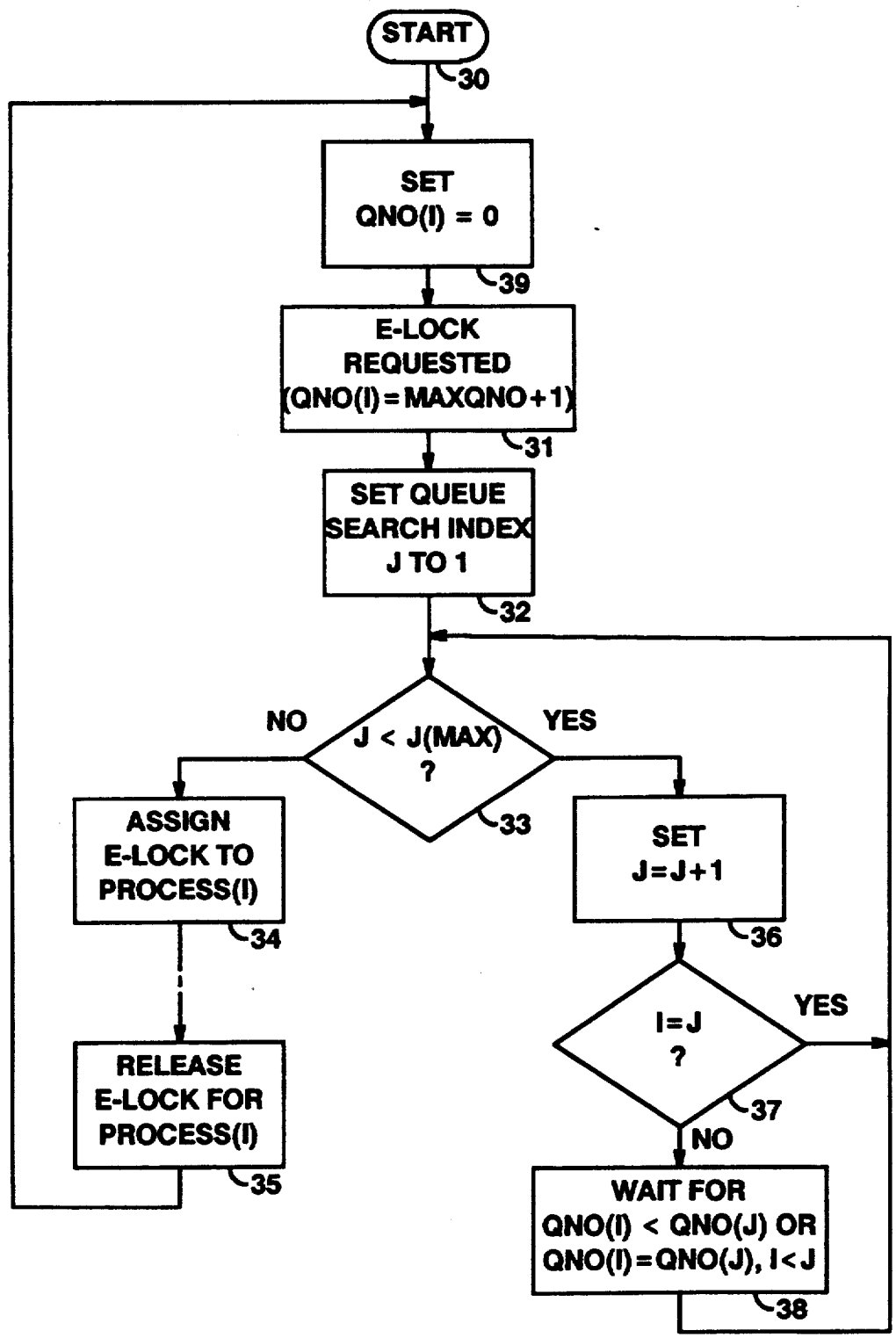
FIG. 3 shows a general flowchart of an exclusive lockout algorithm which can be used in the fault detection arrangements of the present invention.

In FIG. 3 there is shown a flowchart of an exclusive lockout algorithm useful in realizing the fault detection scheme of the present invention. The algorithm of FIG. 3 assigns a resource (imaginary in the present case) exclusively to one resource which is at the top of a queue of requesters for that resource. The procedure of FIG. 3 is disclosed in greater detail at pages 56 and 57 of the aforementioned text by M. Raynal. The procedure illustrated in FIG. 3 is contained in the resource locking mechanism 29 of FIG. 2.

Beginning at terminal box 30, box 39 is entered where a variable QNO(I) is set to zero. Each of the processes of the system of FIG. 2 is represented by a separate entry on a resource queue in request queues 19 of FIG. 2. Each entry on each of the queues is accompanied by a priority number QNO which represents the sequence in which the entries are to be retrieved from the queue. This priority number for the monitored process is set to zero in box 39 to insure the highest priority to the monitored process. The QNO's, of course, determine the order in which the imaginary resource is assigned to the various requesters, starting at the lowest QNO and proceeding to ever greater QNO's. Since all of the QNOs are initialized to the highest possible number (MAXNO=infinity=all 1's), they cannot assigned to the resource until their queue number is set to some lower value. In box 31, the monitored process, PROCESS(I), is then assigned a priority number, QNO(I), which is greater than any other finite priority number on the queue for that resource, i.e., QNO(I)=MAXQNO+1. where MAXQNO=max {(QNO(I): I∈{1, 2, .. ., J(MAX); QNO(I)≠∞} and J(MAX) is the total number of processes, monitored and monitoring, requesting a lock. The process to be monitored is normally the first process to request the imaginary resource, and hence has the lowest queue number, QNO(I)=1. All of the other processes of the system (the monitoring processes) request shared locks on this resource after the exclusive lock is granted, and hence have lower queue numbers and are not assigned the resource at this time.

It is possible that two or more requesters will simultaneously request the same resource and be assigned the same queue number. As will be seen, this ambiguity is resolved by arbitrarily numbering the requesters, and using the requester's number to resolve the ambiguity that arises when two different requesters are assigned the same QNO. The lockout algorithm of FIG. 3 is therefore able to deal with any number of simultaneous requests, thereby insuring an exclusive assignment regardless of ambiguities in the ordering of requests.

The resource requester queues 19 of FIG. 2 are each an array with a number of entries corresponding to the number of requesters, i.e., the number of processes in the monitoring strategy. If J is an index into this array, then the value of J varies from 1 to J(MAX), where J(MAX) is the total number of requesters. In box 32, the index J is set to "1". In decision box 33, the current value of J is tested to determine if this value is less than J(MAX). If the current value of J is less than J(MAX), box 36 is entered where J is incremented by one. Box 37 is then entered to determine if the value of J is equal to the value of I, the priority value of the process requesting the exclusive lockout. If they are equal, decision box 33 is re-entered to test for the next entry in the array. If I and J are not equal, box 38 is entered, where the procedure simply waits until either the queue number for this process is less than the queue number for the Jth process, or the queue numbers are the same, but the index number I for this process is less than the index number J. In either case, decision box 33 is re-entered and loop 36-37-38 repeated until the last entry in the queue has been visited. At that point, decision box 33 is exited to box 34 where the imaginary resource is assigned exclusively to the current process. In box 35, the queue number of this process is then assigned the largest possible value to prevent the assigned resource from participating in future competitions for this resource.

As previously indicated, the algorithm of FIG. 3 can be used to assign an imaginary resource in the exclusive mode to each of the processes of FIG. 2 to be monitored. Thereafter, these same imaginary resources are requested by all of the other processes of FIG. 2 in a shared mode. One procedure for assigning shared mode locks is shown in FIG. 4.

Figure 4:
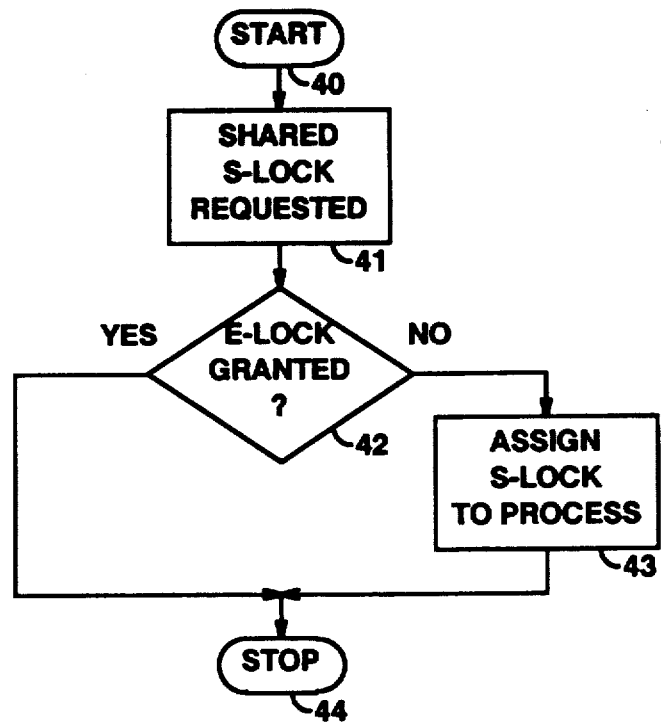
FIG. 4 show a general flowchart of a shared lockout algorithm which can be used in the fault detection arrangements of the present invention.

Turning then to FIG. 4, there is shown an algorithm for assigning shared locks to all of the monitoring processes in the system of FIG. 2. The procedure of FIG. 4 is also implemented in the resource locking mechanism 29 of FIG. 2. Starting at terminal box 40, box 41 is entered where each process requests a shared lock on the imaginary resource assigned to another process. In decision box 42, it is determined whether or not an exclusive mode lock currently exists for this resource. If not, the process is assigned a shared lock on the imaginary resource, indicating that the process having an exclusive lock on this resource has relinquished that exclusive lock and hence has failed. If the exclusive lock is in place, the shared lock cannot be granted and the procedure terminates in terminal box 44.

Figure 5:
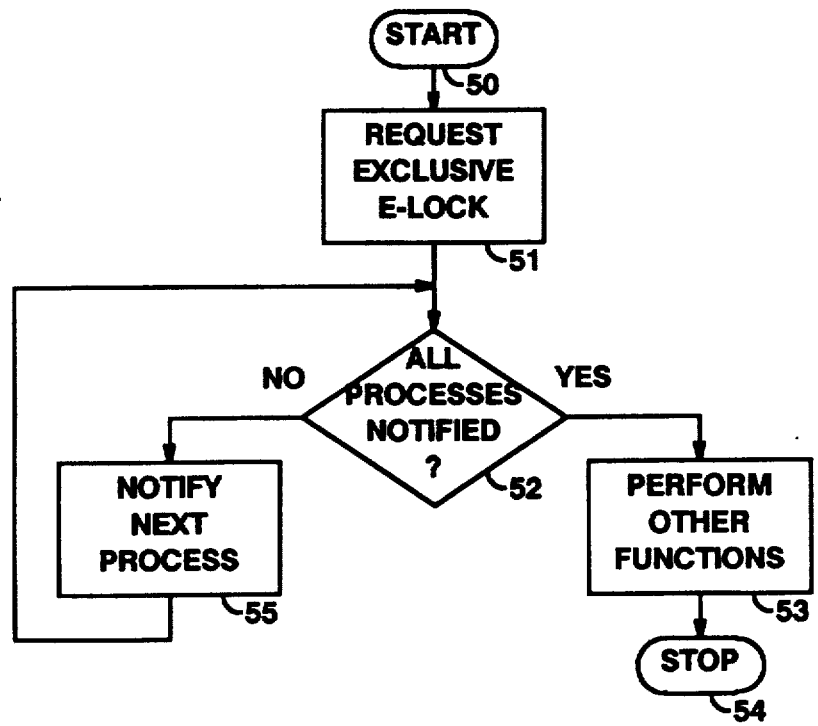
FIG. 5 shows a general flowchart of an exclusive lock request procedure useful in the fault detection arrangements of the present invention.

In FIG. 5 there is shown a detailed flowchart of the exclusive lock request procedure taking place in each process to be monitored. Starting at terminal box 50, box 51 is entered to request the exclusive lock. Once the exclusive lock has been requested, all of the other monitoring processes are notified to release their shared lock to permit the exclusive lock to be granted. In decision box 52 it is determined if all of the processes have been notified. If not, box 55 is entered to notify the next process, and decision box 52 re-entered to determine if all of the other processes have yet been notified. Once all of the other processes have been notified, box 53 is entered to perform whatever other functions have been assigned to this process. The process then terminates in terminal box 54.

It can be seen in FIG. 5 that each process to be monitored requests and exclusive lock on an imaginary resource and notifies every other process to release its shared lock on that resource. After these shared locks are released, the exclusive lock is granted to the process to be monitored. The processes with such exclusive locks can now be monitored as shown in FIG. 6.

Turning to FIG. 6, there is shown a detailed flowchart of the procedure by means of which the processes are monitored. Starting in terminal box 60, box 61 is entered to request a shared lock for the imaginary resource exclusively assigned to the process being monitored. In decision box 62, if the shared lock request is granted (by the procedure of FIG. 4), decision box 68 is entered to determine if the process being monitored has started execution. If the monitored process has started execution (box 68), and if the shared lock has been granted (box 62), that indicates that the monitored process which had the exclusive lock has failed. In box 63, that failure is reported to the failure recovery apparatus. If the shared lock is not granted, or if the monitored process has not yet started, or after process failure has been reported, decision box 64 is entered to determine if an exclusive lock on that resource has been requested, indicating that the failed process has been restarted and is now operative. If so, box 65 is entered to release the shared lock on that resource, thereby allowing the restarted process to obtain an exclusive lock on the imaginary resource. In box 66, the shared lock is again requested to reset the monitoring function. Thereafter, in box 67, the other functions assigned to this process are performed.

If there is no extant request for an exclusive lock, as determined in decision box 64, indicating that the failed process is still out of service, box 67 is entered directly to continue to carry out the functions of this process while the failed process is being repaired and restarted.

It can be seen that the procedures of FIGS. 3, 4, 5 and 6 cooperate to provide a monitoring function for all of the software processes of a data processing system. The failure of a software process is signaled by the release, by that process, of an exclusive lock on an imaginary resource, exclusively assigned to that process. Such a release of the exclusive lock is detected by the granting of a shared lock to one of the other processes in the system for the very same imaginary resource. Such imaginary resources are no more than names or other identifications by means of which the failed processes can be uniquely identified. The fail-safe nature of the resource assigning algorithms insures the detection of all software failures, which can then be used to trigger a failure recovery algorithm. One such failure recovery algorithm is disclosed in the copending application of M-T. Chao, Ser. No. 158,228, filed Feb. 19, 1988, and assigned to applicant's assignee.

It can be seen that the processes of FIGS. 3, 4, 5 and 6 cooperate to provide a dynamic detection of software failures in any of the other processes of FIG. 2. Pseudocode listings for each of these failure detection processes are included in the APPENDIX. The correspondence between the listings and FIGS. 3, 4, 5 and 6 are obvious and will not be further described here. Also shown in the APPENDIX is a combined listing of all of the pseudocode required to implement the present invention in a multiprocessing environment. This "Combined Multiprocess Code" includes both the "Exclusive Request" function and the "Process Monitoring" function. The combined code of the APPENDIX deals with a system comprising N processors P(1), P(2), ..., P(N) in which a failure of any process P(k), where k=1, 2, ..., N needs to be detected. Each of the processes P(1)-P(N) monitors the other (N−1) processes. The failure of any process is then reported by any one of the remaining (N−1) processes and the failure reporting capability will remain intact as long as there is one other process to report the failure.

It should also be clear to those skilled in the art that further embodiments of the present invention may be made by those skilled in the art without departing from the teachings of the present invention.

APPENDIX

Mutual Exclusion Algorithm

```
    main()
    {
5       if resource_request;
        {
            then
            {
                qno[I]=0;
10              qno[I]=1 + MAXQNO;
                for J=0 to J(MAX), I ≠ J;
                {
                    wait least(qno[I], qno[J]);
                }
15              use_resource();
                qno[I]=INFINITY;
            }
            else
            {
20              not_use_resource();
            }
        }
    }
```

Shared Request Algoritm

```
25  main()
    {
        if resource_request;
        {
            then
30          {
                if exlusive_lock_granted
                {
```

```
                    then exit
                    else
                    {
                           grant_shared_lock
                    }
                }
            }
        }
    }
}

/* The following pseudo-code illustrates a monitoring method utilized by
   process P(i) monitoring process P(k).                              */
```

Exclusive Request Code in Process P(k)

```
main()
{
        post_lock_request( name = L(k),
                           resource = R(k),
                           mode = EXCLUSIVE);
        for (i=1; 1≤N; i++)
        {
                notify process P(i): "C(k) is up";
        }
        perform_other_functions;
}
```

Process Monitoring Code of Processes P(i), I = 1, 2, ..., n, i ≠ k

```
main()
{
        post_lock_request( name = L(k),
                           resource = R(k),
                           mode = SHARED,
                           asynchronous_notification_routine
                              = notify_lock_granted(L(i)));
```

```
            if( lock L(k) is granted)
            {
                    report("Component C(k) is inoperative");
            }
5       while(true)
        {
                if received notification "C(k) is up")
                {
                        release_lock( name = L(k),
10                              resource = R(k),
                                mode = SHARED);
                        post_lock_request( name = L(k),
                                resource = R(k),
                                mode = SHARED,
15                              asynchronous_notification_routine
                                = notify_lock_granted(L(k)));
                }
                perform other processing functions;
        }
20  notify_lock_granted(L(k))
        {
                report("Component C(k) is down");
        }
}
```

Combined Multiprocess Code

```
main()
{
        post_lock_request( name = L(k),
                resource = R(k),
30              mode = EXCLUSIVE);
        for (i=1; i≤N; i++)
        {
                if (i ≠ k)
                {
```

```
                send to component C(i): "C(k) is up";
            }
    }
    wait until lock L(k) is granted;
    for (i=1; i≤N; i++)
    {
            post_lock_request( name = L(i),
                            resource = R(i),
                            mode = SHARED,
                            asynchronous_notification_routine
                            = notify_lock_granted(L(i)));
            if ( lock L(i) is granted)
            {
                    report ("Component C(i) is inoperative");
            }
    }
    while(true)
    {
            for (i=1; i≤N; i++)
            {
                    if (received notification "C(i) is up")
                    {
                            release_lock( name = L(i),
                                    resource = R(i),
                                    mode = SHARED);
                            post_lock_request( name = L(i),
                                    resource = R(i),
                                    mode = SHARED,
                                    asynchronous_notification_routine
                                    = notify_lock_granted(L(i)));
                    }
            }
            perform other processing functions;
    }
    notify_lock_granted(L(i))
    {
``` report("Component C(i) is down");
}
}
```

What is claimed is:

1. A software process failure monitoring system comprising
a plurality of software processes to be monitored,
means for assigning an exclusive lock for a unique imaginary resource to each said software process to be monitored,
means for requesting shared locks for all of said unique imaginary resources, and
means responsive to the granting of each of said shared locks for reporting the failure of the software process to which the resource to be shared was uniquely assigned.

2. The failure monitoring system according to claim 1 further comprising
means for releasing said shared lock whenever an exclusive lock for the same resource is requested.

3. The failure monitoring system according to claim 1 further comprising
means for notifying all other processes of the assignment of each exclusive lock.

4. The failure monitoring system according to claim 1 wherein said means for assigning an exclusive lock comprises
a request queue including an entry for each process requesting an exclusive lock, and
means for assigning to each entry in said queue a priority number determining the order of granting of said exclusive lock.

5. A method for detecting software process failures comprising the steps of
assigning an exclusive lock for a unique imaginary resource to each software process to be monitored,
requesting shared locks for all of said unique imaginary resources, and
reporting the failure of the software process to which the resource to be shared was uniquely assigned in response to the granting of each of said shared locks.

6. The method according to claim 5 further comprising the step of releasing said shared lock whenever an exclusive lock for the same resource is requested.

7. The method according to claim 5 further comprising the step of
notifying all other processes of the assignment of each exclusive lock.

8. The method according to claim 5 wherein said step of assigning an exclusive lock comprises the steps of
recording, in a request queue, an entry for each process requesting an exclusive lock, and
assigning to each said entry in said queue a priority number determining the order of granting of said exclusive lock.

9. A software failure detector comprising
a plurality of software processes,
means for assigning a different imaginary resource to each of said plurality of software processes,
means allowing all others of said plurality of software processes to compete for said imaginary resources, and
means for reporting a software process failure each time a competing process is assigned an imaginary resource previously assigned to another process.

10. A method for detecting software failures comprising the steps of
assigning an imaginary resource to a plurality of software processes,
allowing all others of said processes to compete for said imaginary resources, and
reporting a software process failure each time a competing process is assigned an imaginary resource assigned to another process.

* * * * *